United States Patent

[11] 3,578,059

| [72] | Inventors | James R. Uhen<br>Burlington;<br>David L. Olson, Racine, Wis. |
|------|-----------|---------------------------------------------------|
| [21] | Appl. No. | 773,101 |
| [22] | Filed | Nov. 4, 1968 |
| [45] | Patented | May 11, 1971 |
| [73] | Assignee | Tenneco, Inc.<br>Houston, Tex. |

[54] BEAD SPREADER FOR TRUCK TIRES
5 Claims, 7 Drawing Figs.
[52] U.S. Cl................................................. 157/1.21
[51] Int. Cl........................................... B60c 25/12
[50] Field of Search........................................ 157/1.21;
254/93

[56] References Cited
UNITED STATES PATENTS
| 1,812,577 | 6/1931 | Albertine | 254/93X |
| 2,149,395 | 3/1939 | Glynn | 157/1.21UX |
| 2,526,055 | 10/1950 | Webb | 157/1.21UX |
| 2,778,415 | 1/1957 | Murray | 157/1.21 |
| 3,180,623 | 4/1965 | Huber | 254/164 |

FOREIGN PATENTS
| 1,144,328 | 1/1956 | France | 157/1.21 |

Primary Examiner—Granville V. Custer, Jr.
Attorney—Harness, Dickey & Pierce

ABSTRACT: A device for expanding the beads of tubeless tires so as to facilitate filling them with air under pressure comprises a flexible strap that may be looped around the outside of the tire and a device for receiving the ends of the strap and applying tension to the strap. The device preferably includes a frame having a guide neck with rollers through which the strap ends extend with one end being anchored to the frame and the other end extending through a ratchet takeup mechanism mounted on the frame, tension being applied by means of a hydraulic ram assembly connected through rollers to the two end sections of the strap. The hydraulic assembly has a special relief valve to preclude the application of excessive pressure.

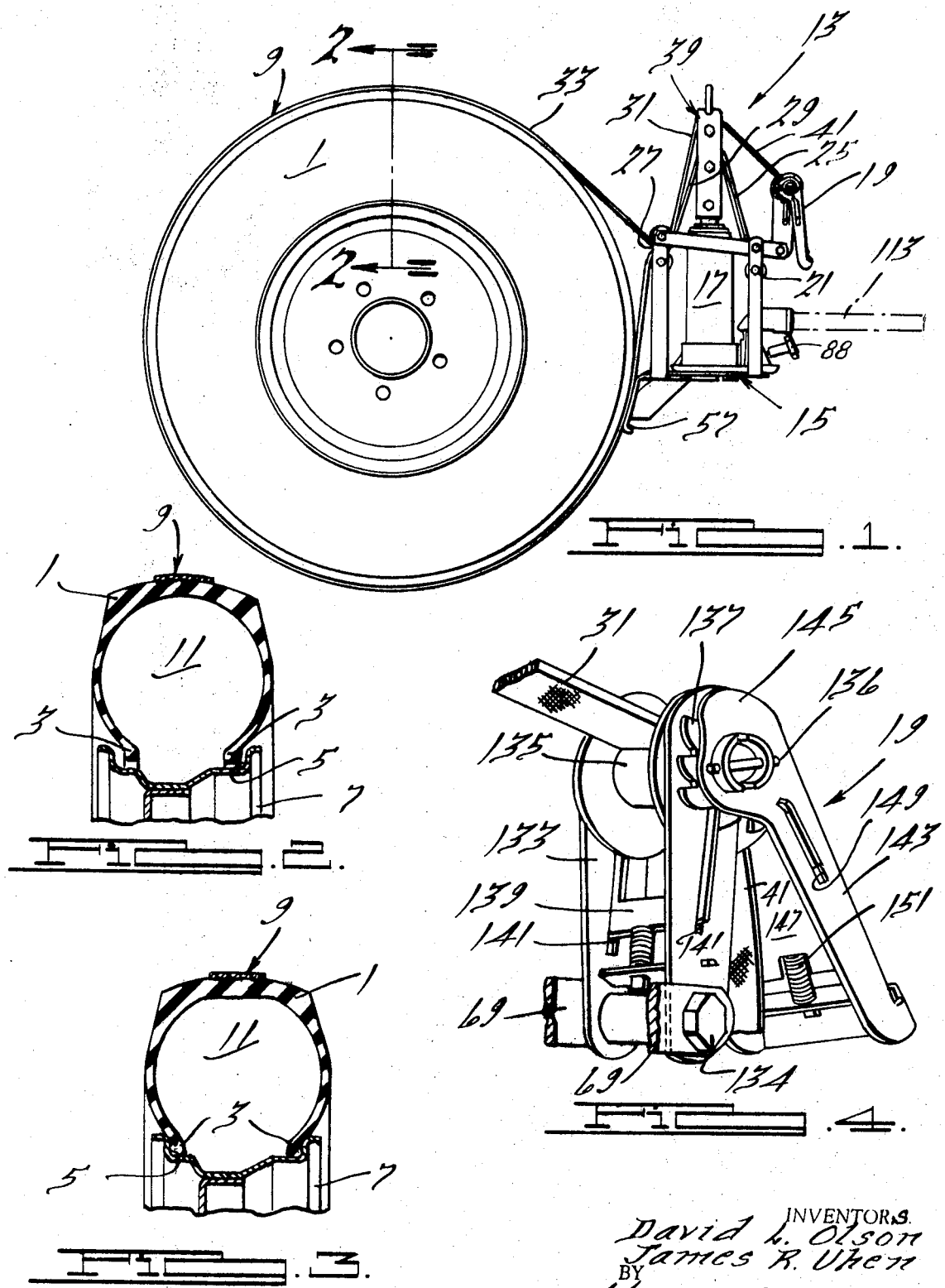

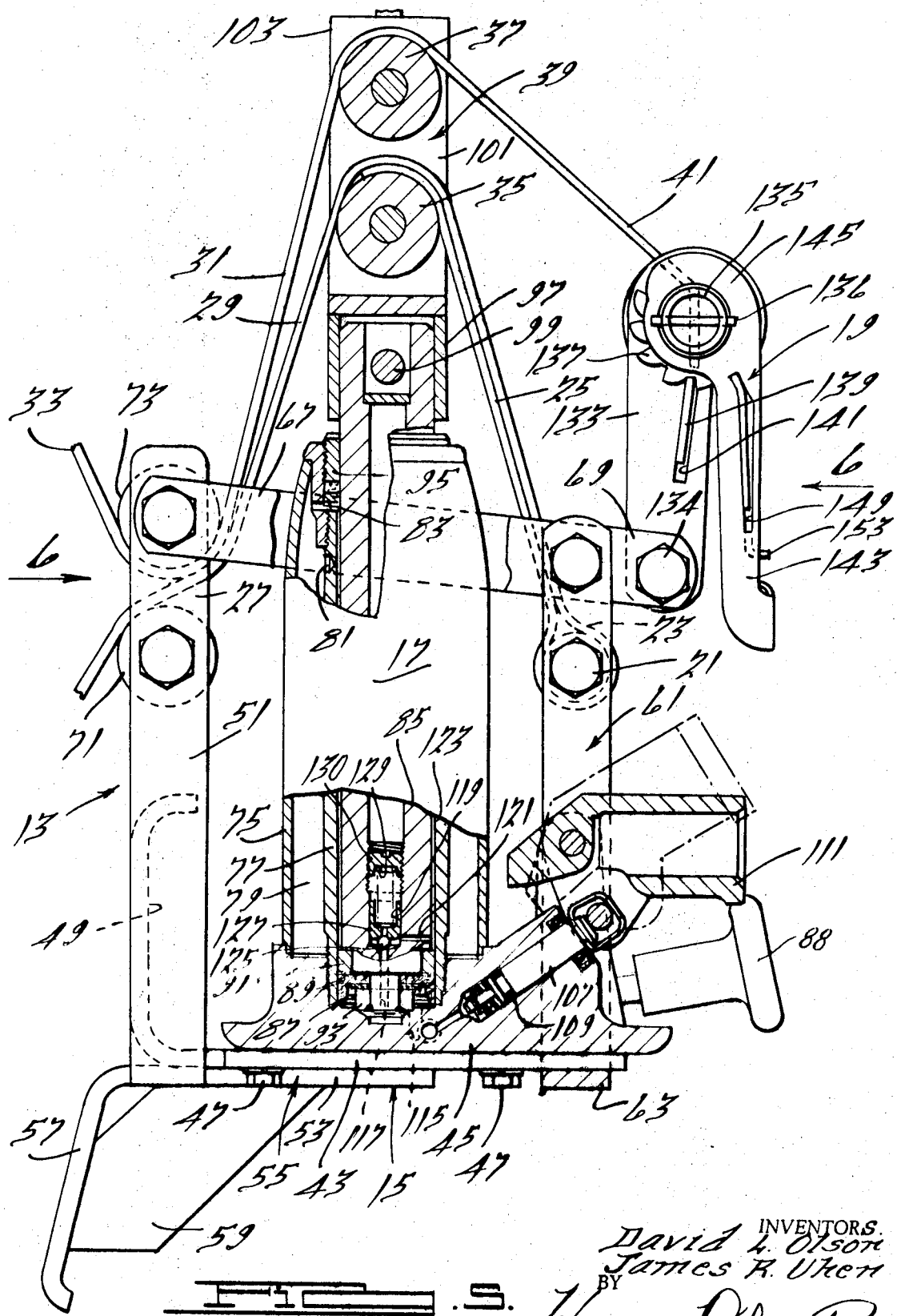

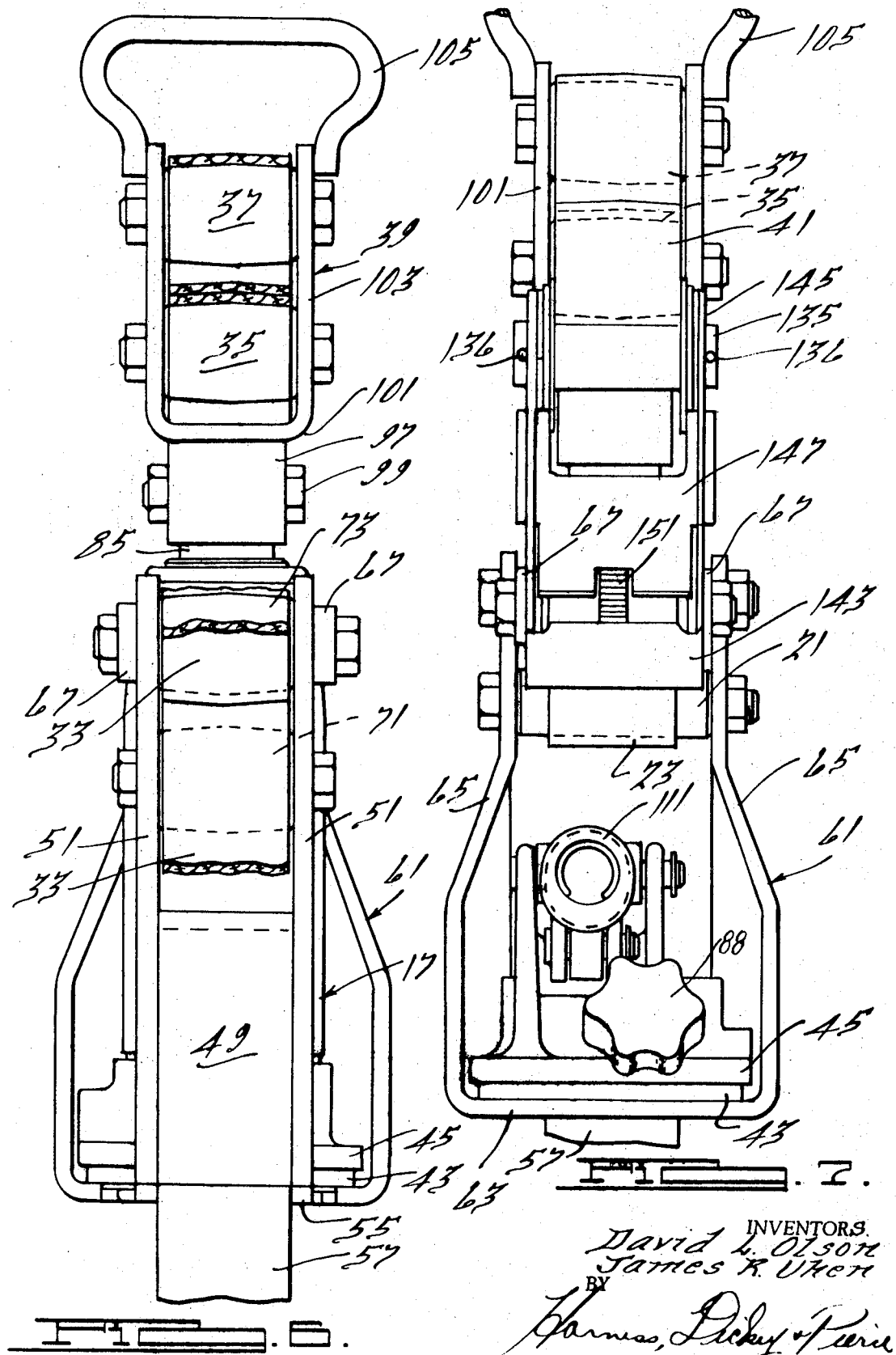

3,578,059

BEAD SPREADER FOR TRUCK TIRES

BRIEF SUMMARY OF THE INVENTION

It is the purpose of the invention to provide a relatively inexpensive and portable mechanism that may be used to assist in the inflation of large tires, such as truck tires. For this purpose the invention utilizes a flexible loop that may be placed around the circumference of the tire and then tensioned so that radial pressure expands the tire beads into sealing contact with the rim of the wheel so that the tire will hold air.

While the device is illustrated in connection with the expanding of truck tire beads, the principles of the invention may be embodied in devices intended for other applications.

DESCRIPTION OF THE DRAWINGS

FIG. 1 is a side elevation of a mechanism embodying the invention and showing it in the course of applying radial pressure to a truck tire;

FIG. 2 is a section along the line 2-2 of FIG. 1 and shows the tire in its preinflation condition wherein the beads are spaced from the rim;

FIG. 3 is a view similar to FIG. 2 but shows the beads in expanded condition ready for tire inflation as a result of tension applied to the strap which is wrapped around the outside of the tire;

FIG. 4 is a perspective view of the ratchet takeup mechanism used to initially loop the strap around the tire;

FIG. 5 is an enlarged view, partly in section, of the strap tensioning mechanism shown in FIG. 1;

FIG. 6 is a side elevation taken from the left or position 5 of FIG. 5; and

FIG. 7 is a side elevation taken from the right or position 6 of FIG. 5.

DESCRIPTION OF THE INVENTION

The truck tire 1 has beads 3 which in relaxed condition of the tire are spaced slightly from rim 5 of the wheel 7 as seen in FIG. 2. In accordance with the present invention, a flexible strap or webbing 9 is wrapped around as much of the outer circumference of the wheel 1 as possible and then placed in tension so that radial pressure, inwardly directed, reduces the diameter of the tire 1 and expands the beads 3 into contact with the wall of the rim 5, as seen in FIG. 3. Air can then be admitted to the interior 11 of the tire 1 and when it reaches a sufficient pressure it will hold the beads 3 in sealed engagement with the rim 5 so that the strap 9 may be released and removed from the tire 1.

The tensioning device 13 for the strap 9 includes, generally, a frame 15, a substantially conventional hydraulic jack 17, and a ratchet type takeup mechanism 19 of a structure that may be similar to that disclosed in U.S. Pat. No. 3,180,623. The frame includes an anchor rod 21 that extends through a stitched anchor loop 23 formed in an overlapped and stitched together end portion 25 of one end of the strap 9 and it also includes a guide neck or throat 27 through which the two end sections 29 and 31 of the strap pass and are brought together so that the loop section 33 of the strap has maximum contact with the outside of the tire 1. The end sections 31 and 29 ride over separate rollers 35 and 37 which form a part of a head assembly 39 that is mounted on and moved vertically by the hydraulic jack 17 and the end portion 41 of the end section 31 is received in the ratchet mechanism 19.

The frame 15 of the device 13 includes a base plate 43 on which is mounted the base 45 of the hydraulic jack 17, being secured to it by the bolts 47. The base 43 has a front portion 49 which extends vertically and at right angles to the bottom portion of the base and fits between and is preferably welded to a pair of straps 51 that are bent vertically from the bottom portion 53 of a support member 55, the support member 55 having a flange or shoe section 57 that extends downwardly from the section 53 and at an angle to it of a little greater than 90° so that as seen in FIG. 1 it can press a portion of the loop 33 against the outside of the tire and serve to increase the total angle of contact of the strap with the tire. A gusset 59 acts between the shoe section 57 and the bottom 53 for strengthening purposes. The frame also includes a U-shaped upright member 61 which has a bottom portion 63 that fits around and is welded to a bottom plate 43 and which has upright sections 65 that receive and support the anchor rod 21 for receiving the end loop 23 of the strap 9.

The two pair of upright sections 51 and 65 are cross-braced by a pair of transverse brace members 67 which project a slight distance beyond the outer member 65, as seen at 69, to serve as a means for supporting the ratchet takeup mechanism 19. The two uprights 51 support between them a lower roller 71 and an upper roller 73 which together form the neck or throat 27 through which the end sections 29 and 31 of the strap 9 are guided to enter the interior of the frame 15.

The hydraulic jack unit 17 is substantially conventional in construction, thereby serving to minimize the total cost of the tensioning device 13. Thus, in addition to the base 49 the jack has an outer reservoir cylinder or tank 75 and a concentric inner pressure cylinder 77, the annular space between cylinders 75 and 77 forming a reservoir 79. There is communication between the interior of the pressure cylinder 77 and the reservoir by means of a valve port (not shown) in the base 45, by a control orifice 81, and by a connecting passage 83 adjacent the top of the unit 17. A ram 85 has a piston structure 87 at its bottom end which includes a flexible cup 89 and an antiextrusion ring 91 secured by a nut 93 to the bottom end of the ram rod 85. The ram 85 extends through suitable packing and structure 95 at the top of the reservoir or tank cylinder 75 and receives the sleevelike bottom end 97 of the head assembly 39 which is secured firmly to it by crossbolt 99. The head assembly 39 also includes a U-shaped strap or yoke 101 having opposite side portions 103 to which the rollers 35 and 37 are secured and supported along with a handle 105 to serve as a means for carrying the unit 13.

The base 45 of the hydraulic jack 17 comprises conventional features including a pump piston 107 that is reciprocated in the pump bore 109 by up and down pivoting of the pump handle socket 111 between the full line and the dotted line positions of FIG. 5, the socket 111 receiving a pump handle 113 as seen in FIG. 1. When the pump piston 107 is forced downwardly it drives liquid previously drawn from the reservoir 79 under pressure through passage 115 into the bottom of the pressure cylinder 77 below the piston structure 87 to raise the ram 85. A manual release valve 88 serves through conventional ports and valves as a means to connect the high-pressure bottom side of the ram to the reservoir whereby the ram is lowered. As a safety means to prevent overstressing of the webbing 9, the ram 85 and piston structure 87 may be modified from conventional construction to include a bypass arrangement which functions at excessive pressure to permit fluid to flow through the aperture 117 the extends through to the piston structure 87 and the bottom end of the ram 85 into an internal cavity 119 in the ram 85 and to a transverse aperture 121 so as to reach the annular space 123 between the rod 85 and the pressure cylinder 77 of the low-pressure side of the piston structure, thus permitting pressure to go directly through the restricted apertures 117 and 121 to the passage 83 and into reservoir 79. The valve mechanism for controlling flow through the aperture 117 includes a ball 125 that is normally held in cavity 119 in position to close the aperture 117 by means of a plunger 127 which is pressed by spring 129 against the ball, the spring being based against plug 130 which is threaded inside of the ram 85. When pressure in aperture 117 is in excess of the setting of the spring 131 it will be relieved by unseating of the ball 125 to prevent overstressing of the strap 9.

As already indicated, the takeup and ratchet mechanism 19 for preliminarily tightening the strap 9 is of the general construction disclosed in U.S. Pat. No. 3,180,623. It includes an attachment bracket 133 that is secured by a bolt 134 to the ends 69 of the braces 67. Supported in the upper end of top portions of the bracket 133 is a slotted drum 135 (held together by roll pins 136) through which the end 41 of the strap can be inserted so that the strap can be tightened by hand around a tire. A ratchet wheel 137 is secured to the drum 135 to rotate with the drum and a spring loaded dog 139 mounted in slots 141 on the sides of the attachment bracket 133 normally fits in the bottom of the ratchet teeth to prevent rotation of the drum in a direction to loosen the strap. A handle 143 has side flanges 145 that pivot on the outer ends of the drum 135 and a dog plate 147 is slidably supported in side slots 149 and urged into contact with the bottoms of the ratchet teeth by a spring 151. When dog plate 147 is in contact with the teeth of the ratchet wheels, pivoted movement of the handle will rotate the drum 135 to provide a means for tightening strap 9. The dog plates 139 and 147 can be pressed down by hand against their springs to disconnect the dog teeth from the ratchet teeth and permit release of the strap end 41 from the takeup device 19.

In operation, after the wheel 7 and tire 1 are positioned, the tensioning device 13 with the strap end section 31 loose is placed next to the tire so that shoe 57 holds the strap 9 against the tire. The strap is wrapped around the tire and the end section 31 inserted through neck 29, run over roller 37, and inserted into ratchet takeup unit 19 so that the strap is manually tensioned around the tire. The jack 17 is then pumped by handle 113 to force ram 85 with head assembly 39 to move transversely of the lengths of end sections 29 and 31 and thereby tension them to reduce the size of the loop section 33 and force the tire beads to the position shown in FIG. 3. After the tire is suitably inflated, the release valve 88 is opened and the takeup device 19 released to loosen the strap so that the tire and wheel can be removed.

We claim:

1. A device for exerting radial pressure on a circular object such as a truck tire comprising a frame including a neck portion, a flexible strap in loop form having a loop section located on one side of the neck portion and two end sections extending through the neck portion, a strap anchor on the frame, one of said end sections being secured to said anchor, a strap takeup device for varying the effective length of the strap and the size of the loop section and including ratchet means to prevent enlarging of the loop section under pressure, a hydraulic jack supported on the frame having a ram for applying tension to the strap end sections so as to reduce the size of the loop section and thereby apply radial pressure to an object within the loop section, a head assembly mounted on said ram and including a pair of rollers, said end sections extending through said head assembly and engaging respectively one of said rollers, said frame including a base shoe extending from the neck portion side of the frame for reaction against and support on said object, said frame including a first pair of upright members on said frame having rollers extending between them to form said neck portion and a second pair of upright members having a rod extending between them to form said anchor, said pairs of upright members being substantially parallel to the axis of the jack and located on opposite sides of the jack.

2. A device as set forth in claim 1 including a pair of brace members extending between said first and second pair of upright members, said takeup device being mounted on said brace members.

3. A device for exerting radial pressure on a circular object such as a truck tire comprising a frame including a neck portion, a flexible strap in loop form having a loop section located on one side of the neck portion and two end sections extending through the neck portion, a strap anchor on the frame spaced from the neck portion, one of said end sections being secured to said anchor, a strap takeup device on the frame spaced from the neck portion for varying the effective length of the strap and the size of the loop section, the other end section being secured to the takeup device, and fluid pressure means on the frame having a ram engaging at least one end section for applying tension to the strap end section so as to reduce the size of the loop section and thereby apply radial pressure to an object within the loop section, said pressure means being disposed so that the ram moves transversely of the length of the end section and substantially tangentially with respect to the loop section.

4. A device as set forth in claim 3 wherein said ram includes a head assembly having a pair of axially spaced rollers, said end sections passing respectively over separate of said rollers whereby the ram applies force to both end sections.

5. A device as set forth in claim 3 wherein said frame includes a base shoe extending from the neck portion side of the frame and adapted to engage the outside of the loop section of the strap, said shoe being shaped to engage the outside of the circular object and react against it through the strap when said strap tightening force is applied to the ram.